United States Patent
Dalton et al.

(10) Patent No.: US 6,923,204 B2
(45) Date of Patent: Aug. 2, 2005

(54) DIAPHRAGM-OPERATED FLUID FLOW CONTROL VALVE PROVIDING A PLURALITY OF FLOW LEVELS

(75) Inventors: James M. Dalton, Elk River, MN (US); Donald J. Kasprzyk, Maple Grove, MN (US); Sybrandus B. V. Munsterhuis, Orono, MN (US); Patrick W. Schottler, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 103 days.

(21) Appl. No.: 10/410,737

(22) Filed: Apr. 10, 2003

(65) Prior Publication Data

US 2004/0200530 A1 Oct. 14, 2004

(51) Int. Cl.⁷ .............................................. G05D 16/20
(52) U.S. Cl. ..................... 137/489; 137/495; 137/510; 137/613
(58) Field of Search ................................ 137/489, 495, 137/510, 613; 251/118, 121, 30.01

(56) References Cited

U.S. PATENT DOCUMENTS

| | | | |
|---|---|---|---|
| 3,304,002 A | * | 2/1967 | Grayson .................... 236/80 R |
| 3,354,901 A | * | 11/1967 | Dietiker et al. ............. 137/495 |
| 3,526,360 A | * | 9/1970 | Ray ........................... 236/68 R |
| 3,896,857 A | | 7/1975 | Turner et al. |
| 4,626,197 A | | 12/1986 | Kumazawa et al. |
| 4,790,352 A | * | 12/1988 | Dietiker et al. ............. 137/613 |
| 4,850,530 A | | 7/1989 | Uecker |
| 5,003,960 A | | 4/1991 | Hanagan |
| 5,033,449 A | | 7/1991 | Hanagan |
| 5,176,358 A | | 1/1993 | Bonne et al. |
| 5,215,115 A | | 6/1993 | Dietiker |
| 5,323,999 A | | 6/1994 | Bonne et al. |
| 5,441,597 A | | 8/1995 | Bonne et al. |
| 5,628,242 A | | 5/1997 | Higley |
| 5,813,394 A | | 9/1998 | Clifford |
| 5,975,072 A | | 11/1999 | Garceau et al. |
| 6,170,507 B1 | * | 1/2001 | Dalton et al. .................. 137/12 |

FOREIGN PATENT DOCUMENTS

JP          04125706 A   *   4/1992

* cited by examiner

Primary Examiner—Ramesh Krishnamurthy
(74) Attorney, Agent, or Firm—Gregory M. Ansems (57) ABSTRACT

A fluid flow control valve uses a servo valve to control the pressure in a main diaphragm chamber defined by a main diaphragm. The main diaphragm carries a main valve element that assumes either a low flow or a high flow position relative to a valve seat depending on which of two states the servo valve is in. When the servo valve is in the one of the two states creating the low flow position of the main valve element, the main diaphragm chamber pressure is regulated by a pressure divider comprising two flow restrictors in series connection between the inlet and outlet chambers of the valve. When in the other of the two states, the servo valve disables the pressure divider and allows the main diaphragm chamber pressure to reach the outlet pressure. The disclosure shows two versions of the invention. One version of the valve enters its low flow state when the servo valve is closed, and the other when its servo valve is open.

17 Claims, 3 Drawing Sheets

DIAPHRAGM-OPERATED FLUID FLOW CONTROL VALVE PROVIDING A PLURALITY OF FLOW LEVELS

CROSS REFERENCE TO RELATED APPLICATION

A related application (Bird application) having the Ser. No. 10/410,765 and currently pending is entitled "Temperature Controlled Burner Apparatus", is filed on the same date as this application by Douglas Bird, and has a common assignee with this application. The Bird application is incorporated by reference into this application.

BACKGROUND OF THE INVENTION

Fluid flow control valves come in a variety of designs. All have an inlet port receiving pressurized fluid whose flow to an outlet port is to be controlled in some way. The outlet port is to be connected to some device that uses the fluid, and for which the rate of fluid flow must be controlled. Where the fluid is a fuel, the outlet port is usually connected to a burner of some kind.

A valve seat is interposed between the inlet and outlet ports of such a valve. A main valve element moves against the seat to close off fluid flow, and away from the seat to allow fluid to flow from the inlet to the outlet port. Such a valve need not operate to shut off fluid flow completely when closed. Such modulating valves can in one way or another, provide for a range of flow levels as the valve element spacing from the seat is changed. Manually controlled gas valves found on nearly every gas stove are a common type of such a valve. These valves allow flow to be adjusted from completely off, to the minimum needed to maintain a flame, to full flow for high heat output.

Certain types of valves are not operated manually. Some of these, called servo-valves, use pressure of the inlet fluid to provide some of the force required to position the main valve element. One type of such a prior art valve is shown in FIG. 1.

Figure 1:
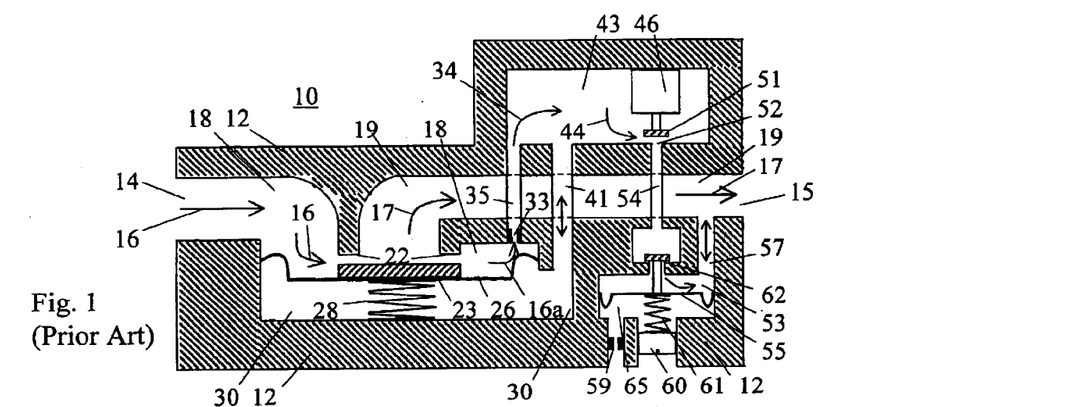
FIG. 1 shows a prior art valve in cross section view, in the valve-open state.

The prior art valve 10 of FIG. 1 is shown in cross section with a body 12 as indicated at a number of places. An inlet port 14 receives high-pressure fluid, which can flow into an inlet chamber 18 in flow communication with port 14.

Fluid can flow through the space between a main valve element 23 and a main valve seat 22 to an outlet chamber 19. From outlet chamber 19, fluid flows through an outlet port 15 to a user device such as a burner. Valve 10 is shown in its open position with main valve element 23 spaced from main valve seat 22. The user device has a known pressure drop from outlet chamber 19 to atmospheric.

Main valve element 23 is carried on a relatively rigid central section of a main valve diaphragm 26. Diaphragm 26 forms a part of the surfaces defining a main diaphragm chamber 30. Main diaphragm 26 forms a fluid-tight seal preventing flow of any fluid directly from inlet chamber 18 to main diaphragm chamber 30. Diaphragm 26 has a flexible periphery with a fluid-tight attachment to the interior surface defining chambers 18 and 30.

A main diaphragm spring 28 within main diaphragm chamber 30 applies force against the center of main diaphragm 26 urging main valve element 23 toward seat 22. Spring 28 has a spring rate constant that causes spring force applied to diaphragm 26 to increase as spring 28 is more fully compressed.

It is convenient to refer to the side of main diaphragm 26 (or any pressure-operated diaphragm) carrying valve element 23 or other valve element as the valve side. The side opposite the valve side of main diaphragm 26 is the control side. It is also convenient to refer to the state or position of a valve element as "open" when shifted as far away from its seat as the system allows, and closed when sealing its seat. A valve element is "partly open" or "partially open" if in a position between open and closed.

Three forces control the main valve element 23 position. This is typically true for any valve element carried on a diaphragm, although some diaphragm-operated valve elements may lack one of these forces. The first of the three forces is the force of the fluid pressure on the valve side of the diaphragm. The second force is the fluid pressure on the control side of the diaphragm. For main diaphragm 26, these pressures are respectively that of the pressure in inlet chamber 18 and on main valve element 23, and the pressure in the main diaphragm chamber 30. The third force is provided by a diaphragm spring such as main diaphragm spring 28.

A servo valve comprising a servo valve element 51 and a servo valve seat 52 controls position of main valve element 23. An electrically operated valve actuator 46 carries servo valve element 51 and can shift element 51 between the open position shown and a closed position with servo valve element 51 pressed against servo valve seat 52. When servo valve element 51 is closed, main valve element 23 is closed as well. Typically, valve actuator 46 includes an internal spring that biases servo valve element 51 so that when actuator 46 does not receive electrical power the spring forces servo valve element 51 to the closed position.

Servo valve element 51 controls fluid flowing through duct 35 to a regulator valve 62 through a duct 54. A regulator diaphragm 55 and spring 61 cooperate to control the position of regulator valve 62 as the pressure in regulator chamber 53 varies. Diaphragm 55 and valve 62 control pressure in main valve diaphragm chamber 30, thereby controlling outlet chamber 19 pressure. The pressure in regulator chamber 53 is held to the pressure in the outlet chamber 19 by the flow communication between chambers 53 and 19 through regulator duct 57.

The regulator diaphragm 55 prevents fluid flow from chamber 53 into the space occupied by the regulator spring 61 and a pressure adjustment screw 60. Adjustment screw 60 can change the spring force applied to regulator assembly 55. The pressure at outlet port 15 increases when screw 60 is turned to shorten spring 61 and thereby increase the force applied urging regulator valve 62 to open further.

Screw 60 forms an airtight seal with body 12 that could interfere with the operation of regulator diaphragm 55. A flow-restricting duct 59 in body 12 bleeds air between the atmosphere and the spring side chamber 65 of regulator diaphragm 55, thereby maintaining atmospheric pressure in chamber 65 while at the same time slowing somewhat (damping) the response of regulator diaphragm 55 to pressure changes in chamber 53.

For a servo valve 10 to operate, an appreciable pressure drop across valve element 23 is required. This pressure drop across main valve element 23 may be approximately 10–40% of the gauge pressure (absolute pressure less atmospheric pressure) at inlet chamber 18, and is adjustable in the embodiment shown. The sum of the pressure drops across main valve element 23 and the user device equals the gauge pressure at inlet chamber 18.

In explaining the operation of FIG. 1 and the other FIGS., the flow of fluid from inlet port 14 to outlet port 15 is indicated by relatively heavy arrows at 16 and 17. Fluid flows for controlling or affecting the position of main valve element 23 (other than the fluid pressure in inlet chamber 18) are shown with thinner arrows, as at 16a and 34.

Closing servo valve seat 52 with servo valve element 51 causes main valve element 23 to close main valve seat 22. When valve seat 52 is closed, fluid pressure in inlet chamber 18 communicates through flow restrictor 33 and duct 35 with servo chamber 43 as shown by arrow 16a. In this way, servo valve element 51 acts to allow pressure in main valve chamber 30 to equalize with pressure in inlet chamber 18.

The result is that the fluid force applied to each side of main diaphragm 28 becomes approximately equal. (In fact, because the net pressure sensed by valve element 23 is that of inlet chamber 18 less the smaller outlet chamber 19 pressure, a small amount of fluid-generated pressure urges valve element 23 toward seat 22.) Force of spring 28 then closes main valve element 23. Spring 28 by itself cannot generate enough force to close valve element 23 against the fluid pressure in inlet chamber 18, but with essentially equal pressure on each side of main diaphragm 26, spring 28 is sufficient to close element 23.

Similarly, whenever servo valve element 51 closes servo valve seat 52, the pressure on each side of regulator diaphragm 55 is equal because pressure equalizes through valve 62 and is essentially atmospheric on each side of regulator assembly 55 as pressure in outlet chamber 19 equalizes with atmospheric through the user device. The regulator spring 61 then holds regulator valve 62 fully open.

When main valve element 23 is to open, valve actuator 46 lifts servo valve element 51 away from servo seat 52. Fluid flows as shown by arrow 44 from chamber 43 to chamber 53 through, servo valve seat 52, duct 54, and open regulator valve 62 to the atmospheric pressure in outlet chamber 19, causing the pressure in chamber 43 to fall well below that in inlet chamber 18. The reduced chamber 43 pressure is communicated through duct 41 to main diaphragm chamber 30, causing the pressure in main valve chamber 30 to equalize with that in servo chamber 43. The reduced chamber 30 pressure causes the net pressure force on main diaphragm 26 to exceed spring 28 force, causing valve element 23 to open.

Pressurized fluid in inlet chamber 18 then begins to flow through valve seat 22 into outlet chamber 19 as shown by arrows 16 and 17. The fluid flowing into outlet chamber 19 from the higher-pressure inlet chamber 18 increases the pressure in outlet chamber 19 from the initial near-atmospheric level.

The pressure drop from inlet chamber 18 to outlet chamber 19 across main valve element 23 along with the pressure drop through the user device holds the pressure in outlet chamber 19 substantially higher than atmospheric. A rule of thumb that often produces satisfactory pressure drop across valve element 23 to operate in full open mode is a total flow area defined by the spacing between element 23 and valve seat 22 that is equal to or less than the area of the opening defined by valve seat 22.

The reduced pressure in servo chamber 43 allows fluid to flow from inlet chamber 18 through flow restrictor 33 into servo chamber 43 as shown by arrows 16a and 34. The fluid flow rate through flow restrictor 33 equals the fluid flow through regulator valve 62 The flow rate through flow restrictor 33 is strictly a function of the pressure difference across flow restrictor 33, and increases with increased pressure drop across flow restrictor 33.

Regulator valve 62 has two purposes. One is to allow the pressure in outlet chamber 19 to be set to a preselected value by adjusting screw 60. The second is to maintain approximately constant pressure in outlet chamber 19 regardless of fluctuations in inlet chamber 18 pressure or user device pressure drop. No regulation of outlet chamber 19 pressure occurs in response to inlet chamber 18 pressure variations without an active regulator valve 62.

The fluid flow rate through regulator valve 62 is a function of the pressure difference across regulator valve 62 as well as the position or setting of valve 62. Main diaphragm chamber 30 pressure equals servo chamber 43 pressure. The setting of regulator valve 62 is a function of the regulator chamber 53 pressure and the regulator spring 61 force. For every setting of valve 62 the resulting pressure in servo chamber 43 and main diaphragm chamber 30 must be a value that results in equal flow through flow restrictor 33 and servo valve 62. The pressure in servo chamber 43 and main diaphragm chamber 30 rises and falls to maintain this equal flow condition at all times.

If outlet chamber 19 pressure decreases slightly for some reason, all other conditions remaining unchanged, then flow through flow restrictor 33 and servo valve 62 increases. The pressure drop across flow restrictor 33 then increases and pressure in servo chamber 43 and main diaphragm chamber 30 falls as well. In addition, decreased outlet chamber 19 pressure causes regulator diaphragm 55 to open regulator valve 62 slightly, decreasing pressure drop across valve 62.

Main diaphragm 26 responds to this lower main diaphragm chamber 30 pressure and shifts main valve element 23 further from seat 22. Pressure drop across main valve element 23 then falls, causing pressure in outlet chamber 19 to rise, restoring the fall in outlet chamber 19 pressure since the net pressure force on regulator diaphragm 55 is referenced to atmospheric.

If inlet chamber 18 pressure should for example fall, regulator valve 62 acts to maintain the selected outlet chamber 19 pressure. Without regulator valve 62, the net pressure difference across main diaphragm 26 changes in a way that is difficult or impossible to predict. On the one hand, the lower inlet chamber 18 pressure acts to allow main valve element 23 to close further, exacerbating the effects of the reduced inlet chamber 18 pressure.

On the other hand, the reduced inlet chamber 18 pressure causes the force in main diaphragm chamber 30 on main diaphragm 26 to decrease as well, causing main valve element 23 to move to a new position that may not compensate for the reduced inlet chamber 18 pressure. The net pressure change on main diaphragm 26 is likely to be uncertain. Accordingly, little or no correction of the drop in outlet chamber 19 pressure occurs without a functioning regulator valve 62.

But with an active regulator valve 62, any pressure drop in outlet chamber 19 regardless of the cause, causes regulator valve 62 to open slightly and the pressure in servo chamber 43 to fall. The lower pressure in servo chamber 43 and main diaphragm chamber 30 causes main valve element 23 to open further from seat 22. The pressure drop across seat 22 falls, raising the outlet chamber 19 pressure and, compensating for the fall in inlet chamber 18 pressure. An increase in inlet chamber 18 pressure induces main valve element 23 to close slightly and reduce outlet chamber 19 pressure. Regulator valve 62 thus compensates for any change in the outlet chamber 19 pressure, to restore that pressure to the preset level.

As a second example of how outlet chamber 19 pressure is sustained at the selected level, consider if at some point, outlet chamber 19 pressure increases for some reason. The increased outlet chamber 19 pressure is communicated to regulator chamber 53 through duct 57 closing regulator valve 62 somewhat and increasing the pressure drop across valve 62. The increased pressure drop across regulator valve 62 increases pressure in servo chamber 43 and main valve chamber 30, causing main valve element 23 to close slightly. When main valve element 23 closes slightly, the pressure drop across main valve seat 22 increases, reducing the pressure in outlet chamber 19 to compensate for the increased outlet chamber 19 pressure.

Outlet chamber 19 pressure can be set to any of a range of values by turning screw 60, and increasing or decreasing the compression of spring 61. The position of regulator valve 62 is controlled by the pressure in regulator chamber 53, which equals the pressure in outlet chamber 19, and by the force of spring 61 opposing the pressure force on diaphragm 55. Additional compression of spring 61 by turning screw 60 further into body 12 results in higher outlet chamber 19 pressure.

To understand this, consider a situation where regulator valve 62 is positioned at a point yielding a particular outlet chamber 19 pressure. If screw 60 is turned to compress spring 61 an additional amount, regulator valve 62 will open further. With valve 62 more open, the pressure drop across valve 62 is smaller. This reduces the pressure in servo chamber 43 and main valve chamber 30. The reduced pressure in main valve chamber 30 results in main valve element 23 opening further and increasing outlet chamber 19 pressure.

Flow restrictor 59 controls flow of air to and from chamber 58 as the position of regulator diaphragm 55 changes. Flow restrictor 59 is selected with a size that provides damping of changes in regulator diaphragm 55 and avoids instability.

One sees from this explanation that an actuator 46 can with relatively small force use the pressure at inlet port 14 to control opening and closing of main valve element 23. At the same time, regulator valve 62 and regulator diaphragm 55 uses pressure at inlet port 14 to hold the outlet chamber 19 pressure relatively constant over a range of inlet chamber 18 pressure.

BRIEF DESCRIPTION OF THE INVENTION

We have modified the previously described servo-controlled fluid valve unit to operate in either full open or partially open states with normal or low flow rates respectively under the control of a low-power servo valve. This valve unit is particularly useful in a burner system for controlling temperature by changing between high and low rates, flow of a fluid fuel such as propane to the burner.

Changing between high and low flow rates rather than between a normal flow rate and shut-off, avoids the need to relight the flame each time heat is required. In essence, the low flow state serves as a pilot flame of sorts. Further, the users of some types of burners prefer the constant presence of some level of flame during the heating or cooking process. These two features are particularly valuable in temperature-controlled cooking grills such as described in the Bird application.

The valve unit components of this invention are selected so that either a high or low flow level occurs depending on the position of a servo valve. Such a valve unit conventionally has a valve body, an inlet chamber for connection to a source of pressurized fluid, and an outlet chamber for connection to a user device such as a burner unit, in which fluid pressure is dropped to essentially atmospheric.

A main valve seat is interposed between the inlet and outlet chambers. A main valve diaphragm carries on a valve side thereof a main valve element in facing and opposed relation to the main valve seat. The main valve diaphragm valve side defines a part of one of the inlet and the outlet chambers. The main valve diaphragm has opposite the valve side a control side defining with the valve body a main valve diaphragm chamber.

A main valve spring applies force to the main valve element to urge the main valve element toward the main valve seat. The force balance arising from the inlet chamber pressure, the main valve diaphragm chamber pressure, and the main valve spring determines the spacing between main valve element and the main valve seat.

The invention is modifications of existing fluid valve unit designs. When modified as taught by the invention, the resulting fluid valve units assume either a partial flow state with the main valve element position close to but not completely closing the main valve seat, or a higher or full flow position with the main valve element spaced further from the main valve seat.

A first flow restrictor is connected between the inlet chamber and the main valve diaphragm chamber. A second flow restrictor is connected between the outlet chamber and the main valve diaphragm chamber. The first and second flow restrictors in combination form a pressure divider between the inlet chamber and the outlet chamber providing between them an intermediate pressure applied to the control side of the main diaphragm chamber. The intermediate pressure controls the position of the main valve.

A servo valve is operable between open and closed states and is in flow connection with the main valve diaphragm chamber. When the servo valve is in a preselected one of the open and closed states, the pressure divider controls pressure in the main valve diaphragm chamber. When the servo valve is in the other of the open and closed states, the servo valve disables the pressure divider and propagates either the inlet or the outlet chamber pressure to the main valve diaphragm chamber depending on the configuration of the main valve. When the pressure divider is disabled, the main valve opens to the high flow state.

In the preferred embodiment, the second flow restrictor includes a pressure regulator similar to that shown in FIG. 1. A second fixed flow restrictor may be added parallel to the pressure regulator valve.

Three versions of this invention are known to exist. In the first and second versions, the main valve element is on the higher pressure, or upstream, side of the main valve seat. With this configuration, higher main valve diaphragm chamber pressure reduces flow through the main valve. In the third version, the main valve element is on the lower pressure, or downstream, side of the main valve seat. With this configuration, higher main valve diaphragm chamber pressure increases flow through the main valve.

In the first version, the servo valve is connected in series with and between the first and second flow restrictors. The main valve diaphragm chamber is directly connected to the inlet chamber low by the first flow restrictor, so that main valve diaphragm pressure equals the pressure at the inlet chamber less the pressure drop across the first flow restrictor. The inlet chamber pressure can be assumed to be constant.

Opening the servo valve enables the pressure divider formed by the first and second flow restrictors to set the main valve diaphragm chamber pressure. The intermediate pressure provided by the pressure divider holds the main valve element at a partial or low flow state. Shutting the servo valve disables the pressure divider and allows outlet chamber pressure to propagate through the second flow restrictor to the main valve diaphragm chamber, thereby causing the main valve element to move further from the main valve seat, to full flow.

In the second version, the servo valve is connected in parallel with the second flow restrictor. When the servo valve is closed, the first and second flow restrictors form a pressure divider to set the main valve diaphragm chamber pressure. This pressure places the main valve element relatively close to the main valve seat to establish the low flow rate state. When the servo valve is open, the second flow restrictor is short-circuited, and the outlet chamber pressure propagates to the main valve diaphragm chamber.

For the first version, two different embodiments are possible for the second flow restrictor. One of these embodiments has a fixed orifice flow restrictor in parallel with the regulator valve. The second alternative employs a servo valve of the type allowing a predetermined fluid flow rate when in the maximum closed position.

The flow rate occurring in the partial flow state depends on a number of the component characteristics, including the relative values of the flow restrictors. The first flow restrictor and the second flow restrictor preferably produce a pressure drop across the first flow restrictor that is smaller when the servo valve is in the preselected one of the states than when the servo valve is in the other of the states.

When the pressure divider is enabled, the smaller pressure drop across the first flow restrictor assures that the main valve element will be closer to the main valve seat than when the pressure divider is disabled.

The third embodiment has a main valve that opens rather than closes with increasing main valve diaphragm chamber pressure. The servo valve opens with increasing outlet chamber pressure. The third embodiment operates much like the first and second embodiments operate.

DESCRIPTION OF THE PREFERRED EMBODIMENTS

Figure 2:
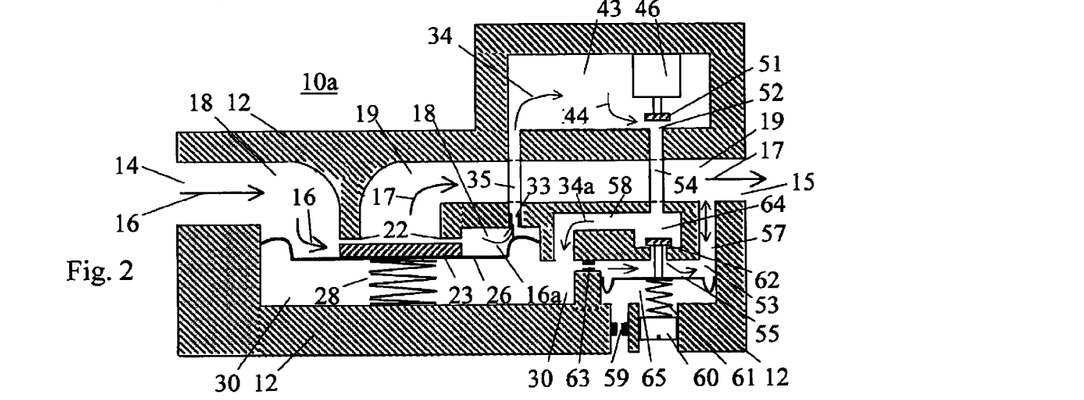
FIGS. 2 and 3 show a first version of a valve invention in cross section view, in respectively low flow and high flow states.
Figure 3:
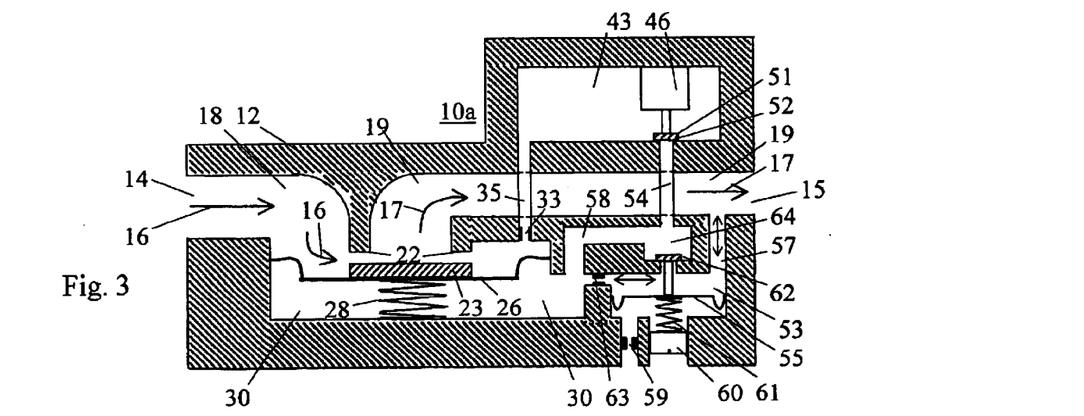
Figure 4:
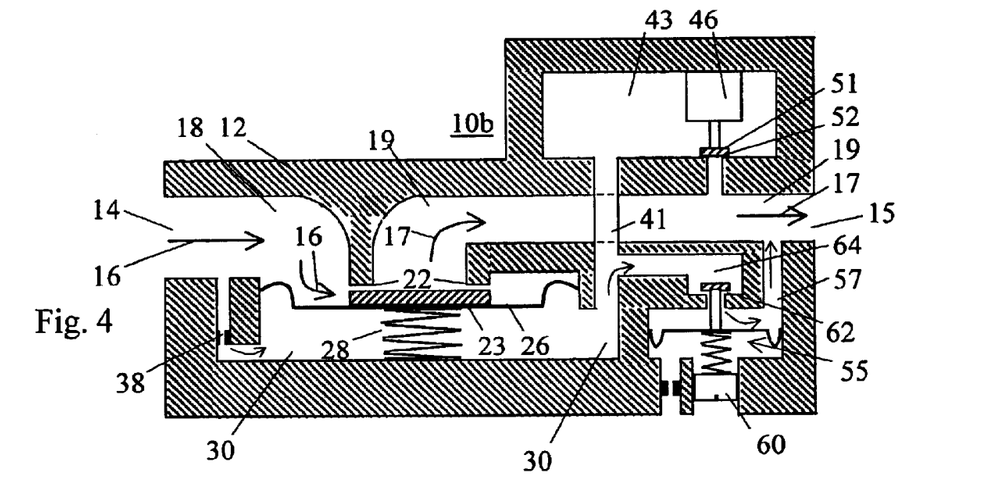
FIGS. 4 and 5 show a second version of a valve invention in cross section view, in respectively low flow and high flow states.
Figure 5:
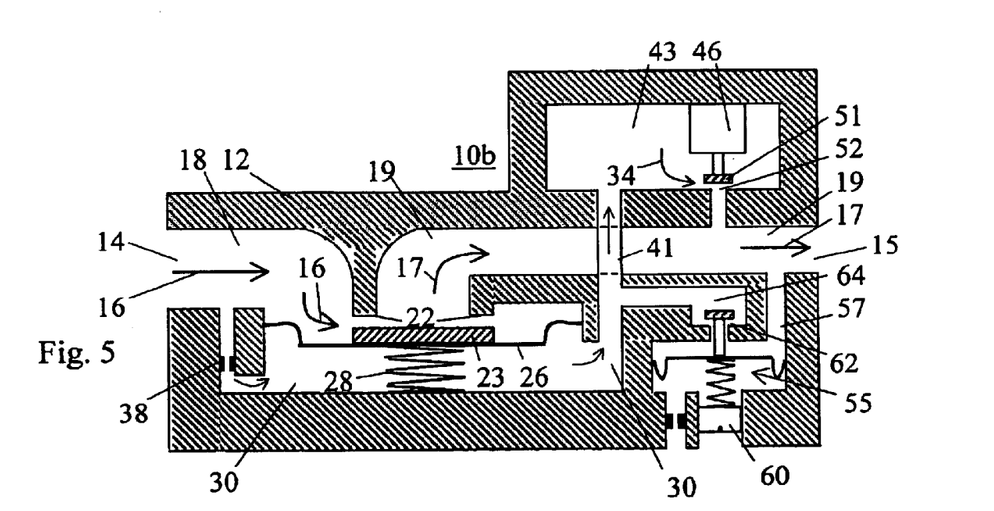

The version of the invention of FIGS. 2–3 is shown as a valve 10a. The version of the invention of FIGS. 4–5 is shown as a valve 10b and the third version is shown as a valve 10c in FIGS. 6–7. Operationally, the FIGS. 2–3 and 6–7 versions differ from the FIGS. 4–5 version in that the FIGS. 2–3 and 6–7 versions enter the higher flow state (FIGS. 3 and 7) when servo valve element 51 is closed. The FIGS. 4–5 version enters the higher flow state (FIG. 5) when servo valve element 51 is open.

The drawings in FIGS. 2–7 each follow the conventions for FIG. 1. Control fluid flows and pressures are shown in light arrows as at 16a and 34a. Heavy arrows as at 16 and 17 denote the flow of fluid from inlet port 14 to outlet port 15. For convenience of the reader, the same reference numbers are used throughout the descriptions of FIGS. 1–7 to denote the same elements. Where an element from one FIG. to the next is similar but not identical, the reference numbers have the same numeric values but the later reference number includes an appended letter.

Figure 6:
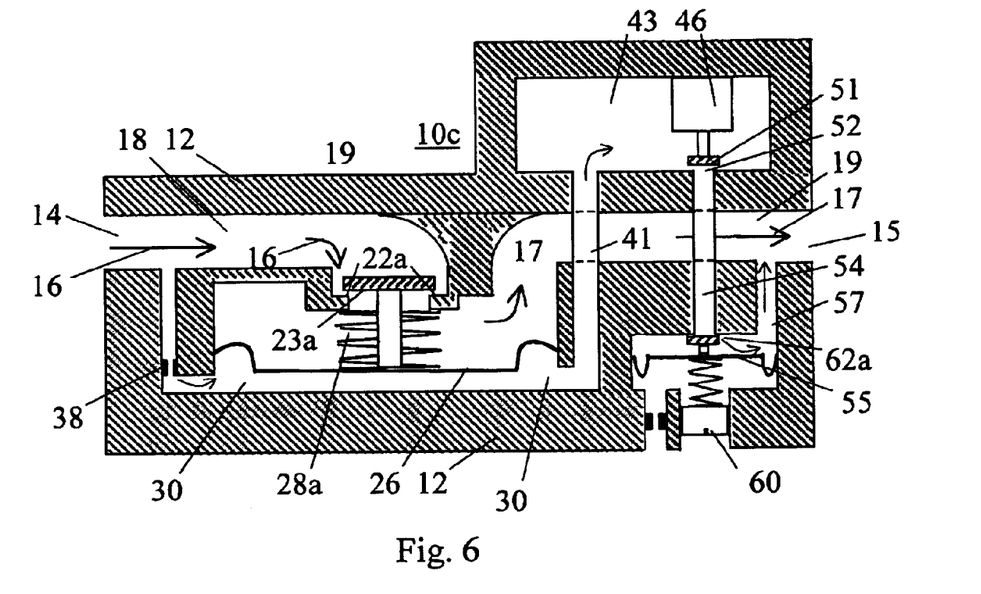
FIGS. 6 and 7 show a third version of a valve invention in cross section view, in respectively low flow and high flow states

The three versions of the invention shown in FIGS. 2–7 provide for outlet chamber 19 pressure regulation by regulator valve 62 only in the low flow states shown in FIGS. 2, 4, and 6. No outlet chamber 19 pressure regulation occurs in the higher flow state of FIGS. 3, 5, and 7. Since the intended use of valves 10a, 10b, and 10c is for thermostatic control of an enclosed space such as a cooking grill, variations in burner heat generation caused by this lack of regulation in one flow rate should not cause problems. And outlet chamber 19 pressure regulation in the low flow state helps to prevent flow so low that flame is extinguished.

An upstream regulator, not shown, can provide some control for outlet chamber 19 pressure in the higher flow states. It is more important to control low flow pressure to reduce the potential for flow rate so low for even an instant that flame is lost. Such a situation may cause flow of unburned fuel, which is at the least annoying and potentially dangerous as well.

In the lower flow state of FIGS. 2, 4, and 6, a pressure divider controls the main diaphragm chamber 30 pressure in the low flow state. The use of a pressure divider connected between the inlet and outlet chambers and whose intermediate pressure is applied to the main valve diaphragm chamber 30 inherently guarantees a setting of main valve 23 or (FIGS. 6 and 7) 23a different from that provided by applying either inlet or outlet chamber pressure to chamber 30.

In the low flow state of valve 10a shown in FIG. 2, electrical power applied to valve operator or actuator 46 holds servo valve 51 open. With servo valve 51 open, flow restrictor 33 and the parallel combination of flow restrictor 63 and regulator valve 62 create a second flow restrictor.

In FIG. 2 first flow restrictor 33 is connected between inlet chamber 18 and main valve diaphragm chamber 30 through duct 35, servo chamber 43, duct 54, and duct 58, as shown by flow symbols 34, 44, and 34a. The second flow restrictor comprising flow restrictor 63 and regulator valve 62 is connected between main valve diaphragm chamber 30 and outlet chamber 19 through duct 57.

The first and second flow restrictors form a pressure divider between inlet chamber 18 pressure $P_i$ and outlet chamber 19 pressure $P_o$. This pressure divider is similar to a voltage divider formed by series resistors in an electrical circuit and can be analyzed in a similar way. For this relatively simple circuit it is unnecessary to determine the fluid "resistance" of the individual flow restrictors. It is sufficient to use a fluid pressure equivalent of Kirchoff's voltage law to determine the pressure in main diaphragm chamber 30.

The pressure $P_{30}$ at the connection between the first and second flow restrictors is applied to main diaphragm chamber 30. The values on which $P_{30}$ depend are inlet chamber 18 pressure $P_i$, outlet chamber pressure $P_o$, the pressure drop across flow restrictor 33 $\Delta P_{33}$, and the pressure drop across the composite flow restrictor formed by flow restrictor 63 and regulator valve 62 $\Delta P_{62\text{-}63}$.

The pressure drop across main valve element 23 is given by $$P_i - P_o = (\Delta P_{62\text{-}63} + \Delta P_{33}) \tag{1}$$

The pressure in main diaphragm chamber 30 is $$P_{30}=P_o+\Delta P_{62-63}=P_i-\Delta P_{33} \qquad (2)$$

The closer main diaphragm chamber 30 pressure is to inlet chamber 18 pressure, the closer main valve element 23 is held to seat 22 by the pressure balance across main valve diaphragm 26 and force from main valve spring 28. One can see from these equations that increasing $\Delta P_{62-63}$ or decreasing $\Delta P_{33}$ increases $P_{30}$. Increasing $P_{30}$ decreases the spacing $X_{23}$ between main valve element 23 and main valve seat 22.

A reasonable approximation for controlling relative pressure drops in this pressure divider relies on the relative cross section areas of the flow restrictors, particularly where the shapes and areas are similar. For example, if one wishes to drop twice as much pressure across the composite flow restrictor of regulator valve 62 and flow restrictor 63 as across flow restrictor 33, the total area of flow restrictor 33 should be about twice that of the sum of the areas of regulator valve 62 and flow restrictor 63.

The outlet chamber 19 pressure $P_o$ directly reflects the pressure drop across main valve element 23. Given a fixed inlet chamber 18 pressure and a fixed pressure drop across the using device, the outlet chamber 19 pressure equals the inlet chamber 18 pressure less the main valve element 23 pressure drop. Nevertheless, the ratio of the areas of the flow restrictors forming the pressure divider provides a reasonable approximation of the ratio of the pressure drops in the pressure divider.

The pressure drop across main valve element 23 is a function mainly of the total flow area between element 23 and seat 22. The flow area is of course directly proportional to the spacing $X_{23}$ of element 23 from main valve seat 22. Main valve element 23 reaches the spacing $X_{23}$ from main valve seat 22 dictated by $P_i-P_{30}$, the area $A_{26}$ of diaphragm 26, $A_{23}$ of main valve element 23, the closure force $F_{28}$ generated by main valve spring 28 when main valve element 23 is contacting valve seat 22, and by the spring rate $k_{28}$ of spring 28. These values are of course easy to choose during the design of the valve.

The net pressure force on diaphragm 26 acting to increase the spacing $X_{23}$ between element 23 and seat 22 is $A_{26}$ $(P_i-P_{30})-A_{23}$ $(P_i-P_o)$ The spring 28 force acting to close valve element 23 is $F_{28}+k_{28}$ $X_{23}$ with the reasonable assumption that $k_{28}$ is constant for the small deflections involved. Main valve element 23 will assume a spacing $X_{23}$ when $A_{26}$ $(P_i-P_{30})-A_{23}(P_i-P_o)=F_{28}+k_{28}$ $X_{23}$. Solving for $X_{23}$, $$X_{23}=(A_{26}\ (P_i-P_{30})-A_{23}\ (P_i-P_o)-F_{28})/k_{28} \qquad (3)$$

Equations 1, 2, and 3 can be used to calculate the values of $X_{23}$ and $P_i-P_o$ yielded by any set of valve 10a elements and using the known element parameters. The fluid flow rate through valve 10a for such a set of parameters can be determined empirically or with reference to available tables.

Depending on the selected area of flow restrictor 33 relative to the effective flow restricting area of flow restrictor 63 and regulator valve 62, a wide range of values for $X_{23}$ and the pressure drop across main valve element 23 is possible.

Valve 10a enters the higher flow rate shown in FIG. 3 when servo valve 51 closes. In this state pressure in main diaphragm chamber 30 equalizes with outlet chamber 19 pressure $P_{oh}$ through flow restrictor 63. The pressure divider is disabled by setting the flow resistance provided by restrictor 33 essentially to ∞ by virtue of the closed valve 51. In FIG. 2, main diaphragm chamber 30 pressure substantially exceeds outlet chamber 19 pressure. FIG. 3 shows the maximum spacing $X_{23h}$ of valve element 23 from seat 22 possible for the parameters involved, since the pressure in main diaphragm chamber 30 equals that in outlet chamber 19.

Note that pressure $P_{oh}$ in outlet chamber 19 is higher in this state than $P_{oh}$ in the lower flow condition of FIG. 2. The value of $\Delta P_{62-63}+P_o$ in FIG. 2 must be higher than $P_{oh}$ in order for $P_o$ to be lower than $P_{oh}$, and for $X_{23}$ to be smaller than $X_{23h}$. The use of the pressure divider and selection of the flow restrictor areas allow this condition to be created.

As one example only, the following dimensions and values are likely to provide suitable performance of valve 10a for controlling flow of LP gas from a standard tank to a portable grill of normal size:

Main diaphragm 26 diameter 55 mm

Main valve element 23 diameter 12 mm

Main valve spring 28 force when valve 23 closes seat 22 18 cN

Flow restrictor 33 diameter 0.30 mm

Flow restrictor 63 diameter 0.10 mm

Regulator diaphragm 55 diameter 20 mm

Regulator spring 61 spring rate 5 cN/mm

Regulator valve 62 flow area when wide open 1 mm$^2$

Main valve element 23 spacing from main valve seat 22, low flow rate <1 mm

Main valve element 23 spacing from main valve seat 22, high flow rate 2–3 mm

Lower flow rate when servo valve 51 is open and actuator 46 powered is often advantageous for the specific application of controlling temperature of a cooking grill. Since the grill controls may operate on battery power, this configuration appears to minimize battery drain.

It is also possible to reconfigure the various elements of the FIG. 1 valve 10 so that the low flow rate occurs when servo valve 51 is closed and actuator 46 is unpowered, and the higher flow rate occurs when servo valve 51 is open. FIGS. 4 and 5 show a valve 10b providing for low flow with servo valve 51 closed and for high flow with servo valve 51 open.

In FIGS. 4 and 5 a flow restrictor 38 directly connects inlet chamber 18 with main diaphragm chamber 30. Duct 41 connects main diaphragm chamber 30 with servo valve chamber 43 and with regulator valve chamber 64. Servo valve seat 52 directly connects servo valve chamber 43 with outlet chamber 19.

When servo valve 51 is closed as in FIG. 4, flow restrictor 38 and regulator valve 62 form a pressure divider between the inlet chamber 18 and the outlet chamber 19. Main diaphragm chamber 30 serves as the connecting duct between flow restrictor 38 and regulator valve 62.

The operation of the FIG. 4 valve 10b is essentially identical to that of the FIG. 2 valve 10a. For reasons to be explained shortly, no fixed flow restrictor 63 is required in parallel with regulator valve 62. For this reason, the regulator valve 62 of FIG. 4 should have somewhat greater area in order to have similar characteristics to the combination of the FIG. 2 flow restrictor 63 and regulator valve 62.

In the higher flow state of FIG. 5, servo valve 51 is open to directly connect main diaphragm chamber 30 to outlet chamber 19, thereby disabling the pressure divider formed by flow restrictor 38 and regulator valve 62, in this case by setting the flow resistance between outlet chamber 19 and main valve diaphragm chamber 30 to 0. Pressure equalizes in diaphragm chamber 30 and outlet chamber 19 through servo valve 51, to reach the higher flow state. One sees that in the high flow state of FIG. 5, servo valve 62 is wide open. This is because outlet chamber 19 pressure is minimum. Because valve 62 is in parallel with the presently open valve 51, the actual state of valve 62 is irrelevant.

The reason that flow restrictor 63 is present in FIGS. 2 and 3 is to allow main diaphragm chamber 30 pressure to equalize with outlet chamber 19 pressure in the higher flow state. Without flow restrictor 63 and with regulator valve 62 completely closed in the higher flow state of valve 10a, no flow from outlet chamber 19 to main diaphragm chamber 30 is possible without flow restrictor 63. In this case chamber 30 pressure might never fall to that of outlet chamber 19. In valve 10b of FIGS. 4 and 5 on the other hand, main diaphragm chamber 30 is directly connected to outlet chamber 19 by the open servo valve 51 so the outlet chamber 19 pressure propagates quickly to chamber 30.

As in FIGS. 2 and 3, adjustment screw 60 controls the outlet chamber 19 pressure for the valve of FIGS. 4 and 5 in the low flow state only. If pressure regulation is not necessary, regulator valve 62 can be replaced with an appropriately sized flow restrictor.

Most of the physical dimensions of a representative valve 10b may be equal to the similar parameters of valve 10a. For equivalent performance, regulator valve 62 flow area when wide open should equal the combined areas of flow restrictor 63 and regulator valve 62 of valve 10a. In practice, flow restrictor 63 of valve 10a is typically so small (0.10 mm. dia.) compared to regulator valve 62 (1 mm. dia.) that the regulator valve 62 in FIGS. 4 and 5 can have the same dimensions as the regulator valve 62 in FIGS. 2 and 3. Our third embodiment is shown as valve 10c in FIGS. 6 and 7. Valve 10c has the main valve element 23a and regulator valve 62a configuration changed from that for valve element 23 and regulator valve 62 in valves 10a and 10b. In valve 10c, the main valve element 23a is on the downstream side of valve seat 22a, and main valve element 23a opens responsive to increased chamber 30 pressure. Also, regulator valve 62a is on the low pressure side of valve seat 22a. The result of these configurations changes the sense or effect of some of the pressure changes, but operation of valve 10c is very similar to that of valves 10a and 10b.

Figure 7:
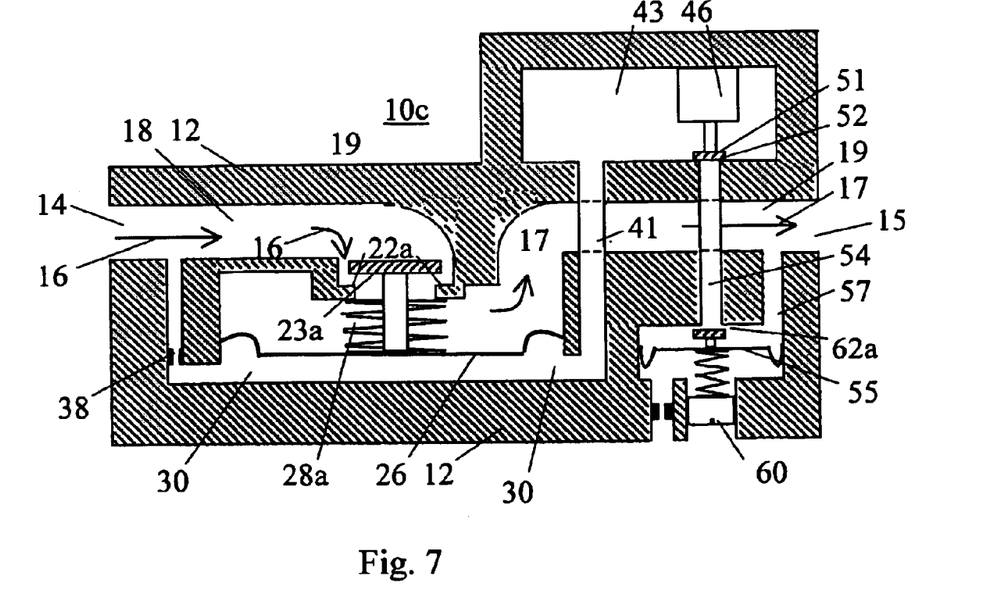

The pressure in diaphragm chamber 30 of valve 10c is regulated and controlled by a pressure divider comprising flow restrictor 38 and regulator valve 62a. This pressure divider is active when valve 51 is open as shown in FIG. 6, and is disabled when valve 51 is closed (FIG. 7). The position that valve element 22a assumes is controlled by the force of main valve spring 28a and the pressure force balance on diaphragm 26. The pressure drop across the user device downstream from outlet 15 forms a pressure divider with main valve element 22a to control the outlet chamber 19 pressure which also affects the pressure force balance on diaphragm 26.

In FIG. 6, the pressure in main valve diaphragm chamber 30 is altered by variations in outlet pressure that change the flow resistance of valve 62a and the pressure drop across flow restrictor 38. One can see that when outlet pressure drops below the setpoint value, the reduced pressure on the regulator diaphragm 55 causes the pressure drop across regulator valve 62a to increase, and therefore the pressure drop across flow restrictor 38 to decrease. Diaphragm chamber 30 pressure therefore increases causing valve element 23a to move further from valve seat 22a, and outlet pressure at chamber 19 to rise because of the reduced pressure drop across valve seat 22a. A complementary effect reduces outlet pressure above the setpoint value.

When valve 51 is closed as in FIG. 7, flow restrictor 38 is disconnected from regulator valve 62a. Closing valve 51 causes inlet chamber 18 pressure to propagate to main valve diaphragm chamber 30, increasing the pressure in diaphragm chamber 30. Valve element 23a moves to a position further from seat 22a. The position that valve element 23a assumes is controlled by the pressure forces on diaphragm 26, the characteristics of spring 28a, and the now-higher pressure in outlet chamber 19. However, the net result of forces on valve element 23a is to cause valve element 23a with valve 51 closed to shift to a position further from seat 22a.

We claim:

1. A fluid control valve having
   a) a valve body;
   b) an inlet chamber for connection to a source of pressurized fluid;
   c) an outlet chamber for connection to a device for dropping fluid pressure to essentially atmospheric;
   d) a main valve seat interposed between the inlet and outlet chambers;
   a main valve element;
   f) a main valve diaphragm carrying on a valve side thereof the main valve element in facing and opposed relation to the main valve seat, said valve side of the main valve diaphragm defining a part of one of one only of the inlet and the outlet chambers, and said main valve diaphragm having opposite the valve side a control side defining with the valve body a main valve diaphragm chamber;
   g) a main valve spring applying force to the main valve element to urge the main valve element toward the main valve seat, wherein the force balance arising from pressure in the one only of the inlet and the outlet chambers, the main valve diaphragm chamber pressure, and the main valve spring determines the spacing between main valve element and the main valve seat;
   wherein the improvement comprises:
   h) a first flow restrictor connected between the inlet chamber and the main valve diaphragm chamber;
   i) a second flow restrictor connected between the outlet chamber and the main valve diaphragm chamber, said first and second flow restrictors in combination forming a pressure divider connected between the inlet chamber and the outlet chamber; and
   j) a servo valve operable between open and closed states and in flow connection with the main valve diaphragm chamber, and when in a preselected one of the open and closed states enabling the pressure divider to control main valve diaphragm chamber pressure, and when in the other of the open and closed states said servo valve allowing fluid from the pressurized source to create across the main valve diaphragm a pressure differential holding the main valve element away from the main valve seat.

2. The valve of claim 1, wherein the second flow restrictor comprises a regulator assembly including:
   k) a regulator valve having inlet and outlet sides respectively in flow communication with the main diaphragm chamber and the outlet chamber;
   l) a regulator diaphragm connected to the regulator valve and having a pressure side receiving outlet chamber pressure and a spring side receiving atmospheric pressure; and
   m) a regulator spring urging the regulator valve to a more open position against the outlet chamber pressure,
   said regulator valve for controlling flow between the outlet chamber and the main diaphragm chamber, and said regulator valve position controlled by the regulator diaphragm and the regulator spring.

3. The valve of claim 2, wherein the servo valve when open connects the regulator valve in series with the first flow restrictor.

4. The valve of claim 2, wherein the servo valve connects the first flow restrictor to the main valve diaphragm chamber.

5. The valve of claim 2, wherein the servo valve is connected in parallel with the regulator valve.

6. The valve of claim 1, wherein the servo valve when open connects the first flow restrictor to the second flow restrictor.

7. The valve of claim 1, wherein the servo valve connects the first flow restrictor to the main valve diaphragm chamber.

8. The valve of claim 1, wherein the servo valve is connected in parallel with the second flow restrictor.

9. The valve of claim 2, including a fixed orifice flow restrictor in parallel with the regulator valve.

10. The valve of claim 2, wherein when the servo valve is in the other of the states the pressure drop across the main valve controls the position of the main valve, and wherein the first flow restrictor, the regulator valve and the servo valve cooperate to produce a pressure drop across the first flow restrictor smaller when the servo valve is in the preselected one of the states than that across the main valve element when the servo valve is in the other of the states.

11. The valve of claim 10, wherein the effective flow area of the first flow restrictor is larger than the effective flow area of the second flow restrictor.

12. The valve of claim 1, wherein the servo valve when in the other of the states disables the pressure divider control of the main valve diaphragm chamber pressure.

13. The valve of claim 2, wherein the valve side of the main valve diaphragm defines a part of the outlet chamber, and wherein the servo valve is in series connection between the main diaphragm chamber and the regulator valve.

14. valve of claim 1, wherein the valve side of the main valve diaphragm defines a part of the outlet chamber, and wherein the servo valve is in series connection between the main diaphragm chamber and the second flow restrictor.

15. The valve of claim 1, wherein the force generated by the main valve diaphragm when the servo valve is in the other of the opened and closed states opposes the main valve spring force.

16. A fluid control valve having
a valve body;
b) an inlet chamber for connection to a source of pressurized fluid;
c) an outlet chamber for connection to a device for dropping fluid pressure to essentially atmospheric:
d) a main valve seat interposed between the inlet and outlet chambers;
e) a main valve element;
f) a main valve diaphragm carrying on a valve side thereof the main valve element in facing and opposed relation to the main valve seat, said valve side of the main valve diaphragm defining a part of one of one only of the inlet and the outlet chambers, and said main valve diaphragm having opposite the valve side a control side defining with the valve body a main valve diaphragm chamber;
g) a main valve spring applying force to the main valve element to urge the main valve element toward the main valve seat, wherein the force balance arising from pressure in the one only of the inlet and the outlet chambers, the main valve diaphragm chamber pressure, and the main valve spring determines the spacing between main valve element and the main valve seat;

wherein the improvement comprises:

h) a first flow restrictor connected between the inlet chamber and the main valve diaphragm chamber;
i) a second flow restrictor connected between the outlet chamber and the main valve diaphragm chamber, said first and second flow restrictors in combination forming a pressure divider connected between the inlet chamber and the outlet chamber; and
j) a servo valve operable between open and closed states and in flow connection with the main valve diaphragm chamber, and when in a preselected one of the open and closed states enabling the pressure divider to control main valve diaphragm chamber pressure, and when in the other of the open and closed states, enabling one only of the inlet chamber pressure and the outlet chamber pressure to propagate to the main valve diaphragm chamber, wherein the valve side of the main valve diaphragm defines a part of the inlet chamber, and wherein the servo valve is placed to control the connection between the main diaphragm chamber and the second flow restrictor.

17. The valve of claim 16, wherein the valve side of the main valve diaphragm defines a part of the inlet chamber, and wherein the servo valve is placed to control a connection between the main diaphragm chamber and the outlet chamber.

* * * * *